July 28, 1925.
R. G. EWING
1,547,797
DRAWING SHEET GLASS
Filed April 6, 1918      2 Sheets-Sheet 1
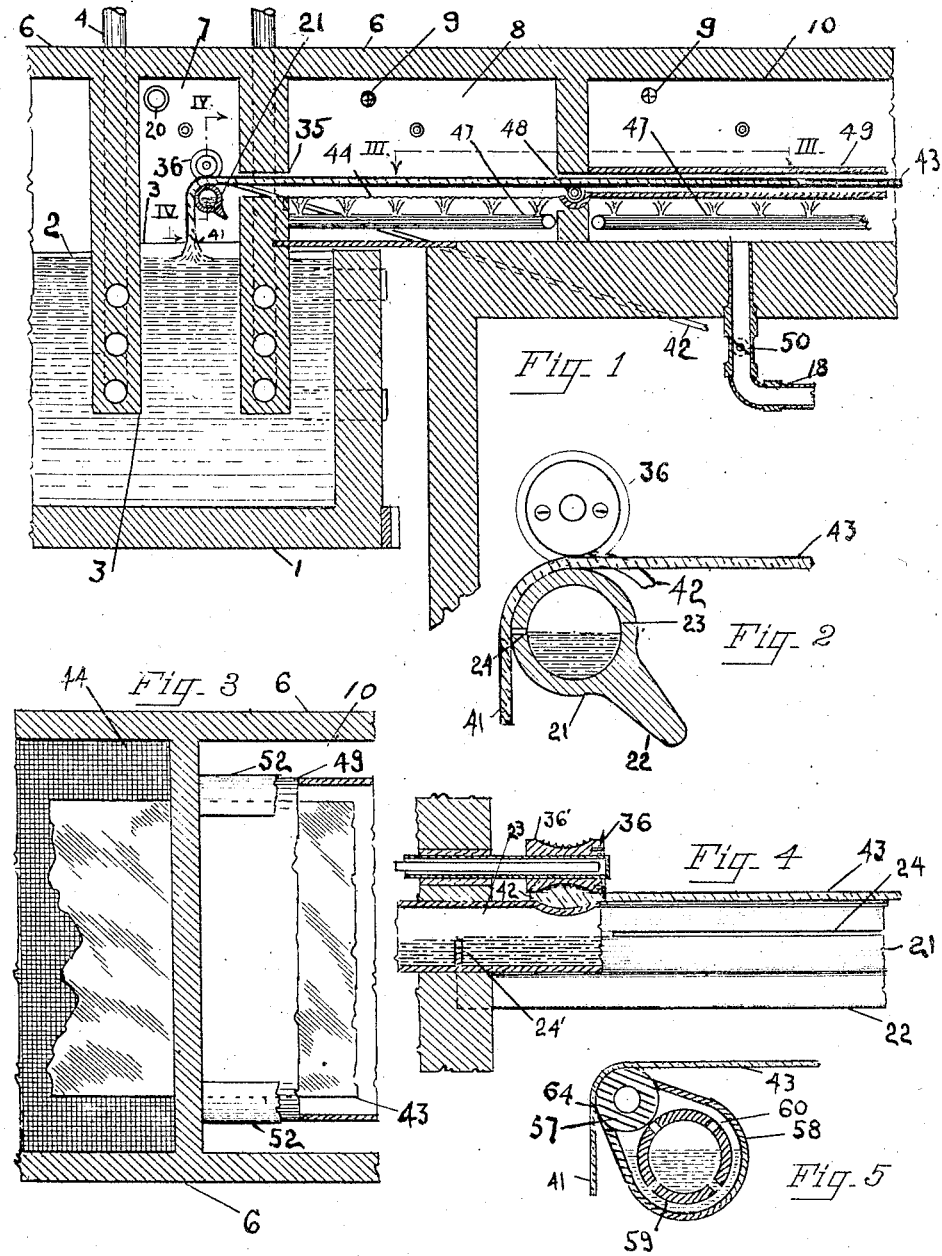
Inventor
Robert G Ewing
By Geo O Kine
Attorney July 28, 1925.
R. G. EWING
DRAWING SHEET GLASS
Filed April 6, 1918
1,547,797
2 Sheets-Sheet 2
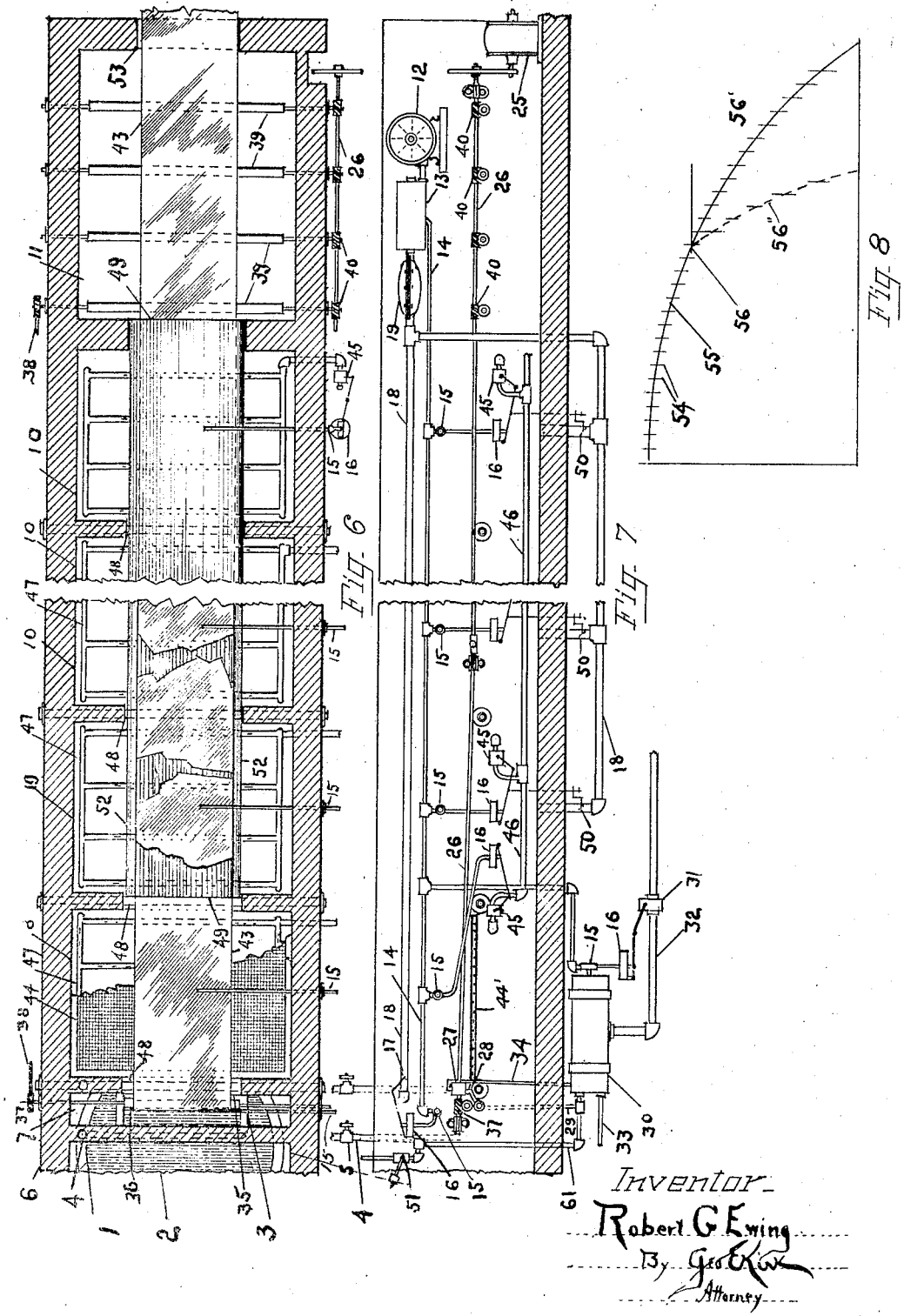

Patented July 28, 1925.

1,547,797

UNITED STATES PATENT OFFICE.

ROBERT G. EWING, OF TOLEDO, OHIO; BEATRICE AMELIA ALEXANDRINA EWING, EXECUTRIX OF SAID ROBERT G. EWING, DECEASED, ASSIGNOR TO THE LIBBEY-OWENS SHEET GLASS COMPANY, OF TOLEDO, OHIO, A CORPORATION OF OHIO.

DRAWING SHEET GLASS.

Application filed April 6, 1918. Serial No. 227,008.

*To all whom it may concern:*

Be it known that I, ROBERT G. EWING, a subject of the King of Great Britain, residing at Toledo, Lucas County, Ohio, have invented new and useful Improvements in Drawing Sheet Glass, of which the following is a specification.

This invention relates to the handling of glass, especially the continuous production of sheet glass.

This invention has utility when incorporated in connection with a tank of molten glass metal, and a series of temperature controlled chambers through which the glass is caused to travel, together with the feature of a hydrocarbon lubricated guide for delivering the glass from the tank to the chambers.

Referring to the drawings:

Fig. 1 is a vertical section through a portion of a mechanism involving features of the invention;

Fig. 2 is a section through the bending guide of Fig. 1;

Fig. 3 is a section on the line III—III, Fig. 1, looking in the direction of the arrows;

Fig. 4 is a section on the line IV—IV, Fig. 1, on an enlarged scale, looking in the direction of the arrows;

Fig. 5 is a detail view in section of a rotary bending guide;

Fig. 6 is a fragmentary plan view of the glass travel way or leer, the top of the way or housing being removed;

Fig. 7 is a fragmentary side elevation of the apparatus of Fig. 6; and

Fig. 8 is a curve of time intervals as to temperature drop, illustrative of the annealing of the glass herein.

The tank 1 may be operated herein to have its contents of molten metal as a pool maintained of constant level in accordance with the disclosure in United States Letters Patent 1,240,185 of Sept. 18, 1917, or this pool of glass may be maintained and replenished in any other approved manner. Thrust into the pool 2 of this tank 1, to provide a quiet region for draw therefrom, is well 3, and a temperature controlling medium may be circulated through pipes or channels 4 in the walls of the well, with the flow thereof adjusted by the valve 5. The well 3 is thus effective to localize a region of the molten metal to approximate the drawing temperature. This region in the top of the open bottom well is a floating islet in a pool of higher temperature. The hot lower region is an assurance of ready free flowing uniformly liquid metal supply into the draw well 3. The chill of material in the well with the resulting gravity tendency to drop, is overcome by the drawing of glass from the well. If the tank 1 be rotated as in Patent 1,240,185, above noted, this will effect rewarming of well-chilled undrawn portions and preclude deleterious results therefrom, although it is especially desirable herein that the mass as cooled for continuous draw be cooled only at the rate of withdrawal, and that the cooling be just before withdrawal, in order that its time interval at the drawing temperature may be short.

Over the drawing well 3 extends the housing 6 providing a chamber 7, which may be closed, and is here shown in direct communication with the pool of molten glass through the well 3. This housing 6, in its extent away from the tank 1, has a series of chambers 8, 10, 11, forming a horizontally extending way or leer for the glass travel in annealing and cooling.

The compressor 12 supplies air to the reservoir 13 from which the high pressure line 14 extends to a plurality of pyrometers 15 distributed along the mechanism for automatically controlling the temperatures. In its operation, the pyrometer 15 in the chamber 7 controls the motor 16 operating a valve 17 in a low pressure air line 18 supplied through a reducing valve 19 from a reservoir 13. Accordingly with control of vent opening 20 to the outside atmosphere, there may be a definite temperature drop in chamber 7.

In the chamber 7 is disposed the fixed bending guide 21 having the radially extending fin 22 to give it strength in carrying the draw load of the glass, even at high temperatures. This guide 21 has therein a chamber 23 with a vent or slot 24 spaced from the bottom thereof. A weir 24' may co-operate in maintaining a liquid in the reservoir 23 up to the slot 24. This slot 24 is narrow, preferably of a length approximating the width of the sheet of glass being drawn. The lower lip of this slot 24 is so disposed as to be contacted by the drawn sheet of glass. In other words, the lower lip of the slot 24 is adjacent the region of the guide 21 where the vertical glass sheet is tangent in coming to the guide.

Motor 25 driving a shaft 26 serves to drive the pump 27 connected by a duct 28 to the chamber 23 for supplying liquid thereto. The liquid may have a positive circulation and thereby assist in cooling the guide 21, as well as lubricating the draw of glass by escaping thereon through the vent 24. The lubricating substance passing from the chamber 23 flows by a duct 29 to a reservoir 30, where its temperature is maintained by a pyrometer 15 automatically acting through the motor 16 in controlling a valve 31 in a steam supply line 32 to a steam coil in the reservoir 30. This steam coil extends as line 33 from the reservoir 30.

With a hydrocarbon, as animal fat, paraffine, beeswax or hydrocarbon oils, the temperature of the liquid in the reservoir 30 may be raised. The hot hydrocarbon supply to the pump 27 through the line 34, seemingly has the property for such further rise in temperature as to come a little closer to the temperature of the glass than may be the case with steam. Whatever the theory, a desirable action on the glass appears to come from the use of a hydrocarbon lubricant.

The fluid escaping through the slot 24 serves as a lubricating vapor cushion for supercooling the plastic sheet of drawn glass. Supercooled is used to denote a drop of temperature in the region of crystallizing temperature whereby crystallization is not effective, as in water cooled below the freezing point without forming ice. This cushion of high temperature extends downward slightly below the lower lip of the vent or slot 24, thus supercooling the near face of the sheet of glass forming a thin skin of toughened surface on the glass prior to the contact of the glass with the bending member, thus assisting the initial set of the sheet. The cushion of lubricant also follows the sheet of glass upwardly in its short length of travel over the small radius guide 21, thus preventing deterioration of the glass at the bend.

After passing the bending member there is sufficient residual heat in the interior and opposite surface to reheat the thin skin and slightly soften it, bringing the sheet of glass to an equable temperature throughout the mass.

While the chamber 7 is cooled, the draw of plastic glass is in the range of temperature for taking form or initial set. However, by disposing the guide 21 in the less viscous formed sheet region of the outwardly drawn plastic glass from the pool, in this temperature controlled chamber 7, isolated from the hot tank 1 by the well 3, there is a maintenance of viscosity and temperature of the drawn sheet sufficient to provide for the reheating and softening of the toughened skin, so that the sheet of glass after passing over the bending member may flatten in the horizontal plane without other heat application.

The short travel from the hot molten glass in the bottom of and through the cooled well 3 into the cooled chamber 7, with quick bend in the chamber 7, reduces the time interval to a minimum for sheet glass formation in continuous drawing from a tank. The metal as to lineal extent has a minimum of mass in the range of crystallizing or devitrifying temperature, and such period of temperature maintenance is short with the glass in a supercooled state from which it is changed precluding devitrification. In the sharp bend of the guide 21, the proximity of the guide 21 to the tank level and the co-operation of the well, are factors permitting this short interval and effecting cooling of the molten mass at the withdrawal rate thereof, thus avoiding any quantity in excess for deleterious action.

Accordingly the sheet has taken only and initial set and may pass along the way from the chamber 7, through the opening 35 to the chamber 8. However, definite width to the draw may be insured by the trimming rolls 36 detachably mounted on the width maintaining, preferably internally cooled, rolls 36', driven by worms 37 on shafts 38. The shaft 38 is driven by one of the glass drawing mechanism rollers 39. The rollers 39 are actuated by worms 40 on the shaft 26.

The draw 41 from the tank 1 through the well 3, may have the edge trimmings 42 taken therefrom to leave the continuous sheet of glass 43 entering the chamber 8, of uniform width and thickness. To remove any deposit, as well as bring to and maintain the glass sheet at an annealing temperature, it may be caused to travel over a perforate diaphragm or flame excluding heat-transmitting screen 44 for such period as may be desired, herein shown as in one chamber. This screen 44 is readily replaceable through the opening 44'.

Owing to the temperature of the glass at the bend, due to the bend taking place at the earliest possible moment after complete formation of the glass sheet, and due to the use of a hydrocarbon supercooling fluid, the thermal endurance of the glass at the bend is not overtaxed, and there is a recovery of plasticity hereinbefore mentioned. In using the expression thermal endurance, it is desired to denote the physical endurance of the glass caused by different temperatures of the internal and external layers of the glass, whereby there is strain caused by unequal expansion or contraction.

The temperature of the chamber 8 is automatically regulated by the pyrometer 15 therein controlling the motor 16. The motor 16 is connected to a valve 45 in fuel line 46 supplying burners 47 below the screen 44. The temperature here may be gaged to avoid any internal permanent stress, as well as remove any hydrocarbon deposit on the glass 43, in order that there may be no irregularities in the travel of the glass along its way over the idler rollers 48 and the live rollers 39. In chamber 8 it is contemplated to give the sheet 43 a definite flat form in a horizontal plane with the mass in such a state of plastic viscosity that it completely flattens.

As the glass now travels into the first of chambers 10, it passes over the idler roller 48, which is somewhat cooled by radiation.

To avoid the introduction of permanent internal stress, the glass 43 in traveling through the succeeding chambers 10, may have its cooling slowed up to maintain at a minimum the difference of temperatures on the surface and interior of the glass sheet 43, until the glass passes from the initial set to a permanent set or hardening throughout the mass.

The rolls 48 are removable, and as glass has slow conductivity for heat, these rolls are preferably insulated and of low conductivity material in order that there may not be localizing of heat withdrawal from the continuous sheet of glass in its travel along the way. When a comparatively low annealing temperature is used, the rolls 48 may be of glass having a high melting point.

This minimizing of temperature difference as to the different portions of the formed mass is the delicate feature for temperature control in the transformation, particularly in sheet glass from the stage of softness to the stage of full setting or hardening as extending through the thickness of the glass. As there can be no permanent internal stress in soft glass (other than crystals or devitrification), and likewise no permanent internal stress can re-appear in hard set glass, the handling herein outlined precludes the development of any permanent internal stress or outward strain promoting set.

To lag the cooling for uniformity approximation throughout the mass, the glass 43, in passing from the chamber 8, enters the envelope 49, as a radiation restricting tube of refractory material, confining the heat given off by the cooling glass to a small region adjacent the glass, and prevent draughts, which give unequal cooling, warping, if not fracturing, the sheet.

Each chamber 10 has its temperature about the envelope 49 maintained as by its pyrometer 15 controlling a fuel supply valve 45 to its burners 47. Still further range of pyrometer travel past the cutting down of burner operation controls the valve 50 in the low pressure air supply line 18 for the additional cooling of such chambers 10 as may be practicable without injury to the glass 43. Each of the chambers 8, 10 is provided with a ventilator 9 for the escape of gases therefrom in accordance with adjustment and as occasion may necessitate.

For further restricting the edge radiation from the envelope 49, and consequent more rapid chilling of the edges of the sheet of glass with possibilities of warping, if not fracture, arising therefrom, the supplementary shields or asbestos edge covers 52 are provided. These poor conductor covers 52 are so designed as to assist in averaging up the mass cooling of the sheet of travelling glass.

In practice the chambers may run in various length intervals aggregating say a two hundred foot leer in length, and when a chamber is long, there must be sufficient supporting rollers 48 to carry the sheet of glass. However, for superior ware production, a minimum length of leer is possible herein, as also a fast travel of the glass sheet therethrough, for immediately the ware has taken on its hardening throughout the mass thereof, internal stress danger is greatly reduced, and the temperature drop may not only approach the natural steps, but may be forced for accelerating the cooling as far as compatible without over-taxing the thermal endurance of the glass sheet in cooling to a state permitting handling as it is discharged from the outlet opening 53.

This temperature maintenance for uniform cooling throughout the glass mass with vertical time or distance interval markings 54 (Fig. 8) shows the slow drop of the curve 55 to the hardening point 56, with the more rapid cooling possible thereafter on the curve 56', or even the curve 56'', if desired. With glass delivered to the leer at high temperature in a less viscous condition there may be little, if any, internal stress evidenced and when present, it disappears in a few seconds or minutes at the most. With the glass thus approaching the set or hardening point, when it has cooled one third, speeding the rate of cooling thereafter, together with the delivery at high temperature, means considerable saving of the leer length and consequent reduction in installation expense, or an increase of speed through the leer thereby making an increase of product.

Instead of a fluid escape from the stationary vent 24, the end of effective lubrication may be obtained by providing a rotatable guide 57 (see Fig. 5) over which the draw of glass is bent, said guide 57 proturding into the chamber 58 to contact the rotatable tubular member 59 having the recesses 60. The following member 59 is effective to bring a uniform supply of the liquid into contact with the face of the guide roller 57, so it may be taken out to contact the glass guided thereon through the vent 64, practically sealed by the draw of glass. The sealing caused by the tight fit of the guide 57 in the opening of the chamber 58 controls the feed as well as prevents access of hot gas or atmosphere into the chamber 58.

To safeguard in the event of generation of vapors at the bending guide, which vapors might not escape at the vent, there is provided the duct 61 in communication with the circulation system return line 29, which duct 61 has a relief valve 51.

What is claimed and it is desired to secure by Letters Patent is:

1. In continuous sheet glass drawing mechanism, a tank for the molten glass supply, a hollow bending member having fluid supply means leading from the interior to the exterior bending surface thereof, and a leer to which glass passing the bending member from the tank may be delivered.

2. In continuous sheet glass drawing mechanism, a tank for molten glass supply, and a bending member for glass from the tank, said member having a fluid supply duct therein and a feed slot connecting the duct and outer bending surface of the bending member.

3. In sheet glass drawing mechanism, a hollow member about which the sheet is bent, said member having an interior reservoir for fluid lubricant, and a vent for the lubricant communicating with the bending surface.

4. In continuous sheet glass drawing mechanism, a tank for molten glass supply, a convex bending guide for glass from the tank, said guide being provided with an internal reservoir and with a vent from said reservoir through the bending portion thereof to the glass contacting guide surface permitting lubrication of the guide therethrough, and a leer to which the guide may deliver.

5. A molten glass container and means for forming glass therefrom into a sheet including a liquid hydrocarbon lubricated guide.

6. In continuous sheet glass drawing mechanism, a tank for molten glass, a fluid carbon compound lubricated fixed guide for changing the direction of draw travel of metal as formed glass from the tank.

7. In continuous sheet glass drawing mechanism, a tank for molten glass supply, a bending member for glass from the tank, a leer, a perforate diaphragm in the leer supporting means for the glass in the leer, on one side of which the formed glass may pass, and a burner on the opposite side of the diaphragm from the glass.

8. In continuous sheet glass drawing mechanism, a tank for molten glass supply, a bending member for glass from the tank, a closed horizontal leer, and opposing radiation restricting marginal shields for the sheet edges of glass.

9. In continuous sheet glass drawing mechanism, a tank for molten glass supply, a bending member for glass from the tank, a leer, and spaced from the leer walls in the leer an envelope for the glass delivered by the member to the leer.

10. In continuous sheet glass drawing mechanism, a tank for molten glass supply, a bending member for glass from the supply, and a horizontal leer embodying several chambers in a straight series to which the continuous sheet glass may travel successively.

11. In continuous sheet glass drawing mechanism, a tank for molten metal, a bending member for regulating draw of glass from the tank, a horizontal leer having several chambers in straight series for continuous travel of the glass sheet therethrough, and pyrometric control means independently adjusting the temperatures of the chambers.

12. In continuous sheet glass drawing mechanism, a tank for molten glass supply, a bending member for glass from the tank, a horizontal leer, and spaced from the leer walls radiation restricting shields in the leer for glass from the member.

13. In continuous sheet glass drawing mechanism, a tank for molten glass, a bending member for glass from the tank, a horizontal leer, burner means for the leer, supporting means for the glass in the leer, and a perforate diaphragm as a flame excluding heat-transmitting screen between the burner means and glass in the leer.

14. In continuous glass drawing, the method of bending a draw of molten metal including liquid hydrocarbon lubrication of the metal.

15. In continuous glass drawing, the method of treating drawn plastic glass including liquid hydrocarbon supercooling of the glass.

16. In continuous sheet glass drawing mechanism, a tank for molten glass supply, and thereabove a bending member for glass from the tank, there being fluid carbon compound lubricating means for the glass contacting portions of the bending member.

17. In continuous sheet glass drawing mechanism in which the sheet of glass is first drawn vertically, then bent to a horizontal plane, a tank providing a pool for molten glass supply a stationary convex bending guide for glass from the tank, said guide being over the tank in proximity to the glass pool in the tank providing an open upward draw from the pool, and a leer to which the guide may deliver glass horizontally from said upward draw.

18. In sheet glass drawing mechanism, a tank for molten glass supply, and a transversely extending member disposed above the tank in proximity thereto forming a convex bending guide for glass from the tank, there being fluid carbon compound supply means at the glass bending region of the member for lubricating the member.

19. In continuous sheet glass drawing mechanism, a tank for a pool of molten glass, a fixed draw well having walls extending down into the pool of the tank and short of the bottom of the tank, temperature control circulating means in the walls of the well, a bending guide as to which the glass from the well may have relative travel thereover, and a leer to which the guide may deliver.

20. In continuous sheet glass drawing, the method of drawing sheet glass from a depth pool of plastic molten glass in contact with hotter molten glass moving thereunder, including controllably lowering the temperature of the glass in the pool below the draw region surface by providing a closed passage below the surface of the pool and circulating a temperature controlling medium to, through and from said passage.

21. In the handling of hot sheet glass, a guide for sustaining the hot sheet during travel of the sheet thereover upward, and fluid carbon compound supply means in the region of hot glass contact with the guide for lubricating the guide.

22. In the production of sheet glass by drawing from the top of an open pool, the bending of the sheet in its initially forming region before cooled to retain strains therein, and lubricating the sheet on the supporting side of said bent portion by supplying a carbon compound fluid in its coaction with the hot sheet of glass.

23. Sheet glass drawing mechanism comprising a tank for a pool of molten glass, a bending member disposed over the pool and fixedly mounted against movement transversely of the sheet from the pool passing thereover, and means actuating the sheet for sliding the sheet relatively to the member during the progress of the sheet from the tank.

In witness whereof I affix my signature.

ROBERT G. EWING.